United States Patent [19]

Kataoka et al.

[11] Patent Number: 5,041,467

[45] Date of Patent: Aug. 20, 1991

[54] METHOD FOR PRODUCTION OF PARTICULATE POLYMERS

[75] Inventors: Hironori Kataoka, Nara; Kazuhito Jinno; Tokiko Yamashita, both of Kyoto, all of Japan

[73] Assignee: Dai-Ichi Kogyo Seiyaku Co., Ltd., Kyoto, Japan

[21] Appl. No.: 577,425

[22] Filed: Sep. 4, 1990

[30] Foreign Application Priority Data

Sep. 8, 1989 [JP] Japan .................................. 1-234475
Sep. 8, 1989 [JP] Japan .................................. 1-234476

[51] Int. Cl.$^5$ ............................................. C08G 18/14
[52] U.S. Cl. ....................................... 521/99; 521/159; 521/164; 521/167; 521/168; 521/169; 521/170; 521/172; 521/173; 521/174; 524/839; 524/840; 524/871; 524/874; 524/875; 528/48
[58] Field of Search ................. 521/99, 159, 164, 167, 521/168, 169, 170, 172, 173, 174; 524/839, 840, 871, 874, 875; 528/48

[56] References Cited

FOREIGN PATENT DOCUMENTS 508116 3/1973 Japan .
5134880 2/1974 Japan .
569531 9/1974 Japan .
5110878 9/1974 Japan .

*Primary Examiner*—Maurice J. Welsh
*Attorney, Agent, or Firm*—Jordan and Hamburg

[57] ABSTRACT

This invention relates to a method of producing particulate polymers. This production method is characterized in that a mixture of an isocyanate compound containing two or more isocyanato groups per molecule and a surfactant containing two or more hydroxyl groups per molecule is emulsified and allowed to cure in a dispersing medium which does not dissolve the isocyanate compound without use of a protective colloid. According to the production method of the invention, there occurs no aggregation of polymer particles during and after the curing reaction.

7 Claims, No Drawings

METHOD FOR PRODUCTION OF PARTICULATE POLYMERS

BACKGROUND OF THE INVENTION

The present invention relates to a method of producing a particulate polymer.

Particulate polymers are intended for use as matting agents for paints, additives to suede- or velvet-texture coatings, cosmetic products, agrochemicals, drugs, etc. and it is foreseen that these polymers will find application in a still greater variety of fields in the years to come.

Among the known manufacturing methods for particulate polymers are the method which comprises reacting a polyester or polyether with an isocyanate in the presence of an oil-modified alkyd resin in a solvent (Japanese Patent Publication No. 50-8116) and the method which comprises the steps of emulsifying a mixture of a polyol and a polyisocyanate in the presence of an emulsifier and a protective colloid in water and, then, adding a polyamine or a catalyst (Japanese Patent Publication No. 51-34880, No. 51-10878 and No. 56-9531).

In these known manufacturing technologies for particulate polymers, it is essential to add an oil-soluble or water-soluble protective colloid, such as oil-modified alkyd resin, polyvinyl alcohol, gelatin or the like, in order to preclude aggregation of particles during the curing reaction.

However, the addition of such of protective colloid results in the following disadvantages.

(1) Owing to the thickening or viscosity-building effect of the protective colloid, the recovery step after production of particles requires a prolonged filtration or centrifugation procedure and, in worst cases, the recovery becomes substantially impossible.

(2) In drying the separated particles to obtain a powder, if the particles are directly dried without washing, the protective colloid remaining on and between the particles forms a film to interconnect the particles, thus preventing effective reduction to a powder. For the removal of the protective colloid for recovery of a neat powder, a washing step is essential.

(3) In the use of the powder or beads as a component of a coating, the residual protective colloid acts as a binder to lower the dispersibility of the particles.

The prior art manufacturing technologies have these additional drawbacks.

(4) The prior art requires a special emulsifying machine, such as a homogenizer, colloid mill or homodisperser.

(5) Anionic, cationic or amphoteric particulate polymers cannot be produced.

(6) In dispersing the particulate polymer in a coating material or solvent suited to the intended application, even the use of a dispersing agent does not insure good dispersibility.

(7) The particulate polymer is are poor in heat resistance and solvent resistance.

SUMMARY OF THE INVENTION

The object of the present invention is to overcome the above-mentioned disadvantages of the prior art manufacturing technologies and provide a method of producing a particulate polymer which dispenses with a protective colloid and yet is free from the aggregation of particles during and after the curing reaction.

The method of producing a particulate polymer according to the present invention is characterized in that a mixture of an isocyanate compound having two or more isocyanato groups per molecule and a surfactant having two or more hydroxyl groups per molecule is emulsified and dispersed in a dispersing medium which does not dissolve said isocyanate compound without addition of a protective colloid and cured as it is.

DETAILED DESCRIPTION OF THE PREFERRED EMBODIMENTS

The isocyanate compound having two or more isocyanato groups per molecule, as employed in the present invention, include various polyisocyanates and urethane prepolymers.

The polyisocyanates mentioned above include, *inter alia*, tolylene diisocyanate, diphenylmethane diisocyanate, naphthalene diisocyanate, hexamethylene diisocyanate, tolidine diisocyanate, isophorone diisocyanate, xylylene diisocyanate, hydrogenated diphenylmethane diisocyanate, carbodiimide-modified diphenylmethane diisocyanate, hydrogenated tolylene diisocyanate, triphenylmethane triisocyanate, hexamethylene triisocyanate, polymethylene polyphenyl isocyanate, tolylene diisocyanate trimer and so on.

The urethane prepolymers mentioned above include, *inter alia*, the isocyanato-terminated isocyanates obtainable by reacting the known polyols with excesses of said polyisocyanate compounds. The known polyols include polyhydric alcohols, polyether polyols, polycarbonate polyols, acrylic polyols, polyester polyols, silicone polyols and so on.

With regard to the isocyanate compound having two or more isocyanato groups per molecule, any one of the compounds mentioned above may be selectively used or, if desired, more than one of them can be selectively used. By appropriate selection of these isocyanate compounds, a broad spectrum of particulate polymers ranging from very hard particles to soft and flexible particles can be manufactured. Generally, hard particles are obtained when a polyol-free polyisocyanate compound or a urethane prepolymer containing a short-chain polyol component is employed, while flexible particles are obtained when a urethane prepolymer containing a long-chain polyol component is employed.

The use of an aliphatic polyisocyanate yields particles which are hard to undergo yellowing and resistant to weather. In order to improve the solvent and heat resistances of polymer particles, it is advantageous to increase the degree of crosslinking by using an isocyanate compound containing three or more isocyanato groups per molecule.

With regard to the surfactant having two or more hydroxyl groups per molecule, any of nonionic surfactants, anionic surfactants, cationic surfactants and amphoteric surfactants can be employed.

The nonionic surfactants containing two or more hydroxyl groups per molecule include, *inter alia*, polyoxyethylene-polyoxypropylene block polymer, sorbitol fatty acid esters, sorbitan fatty acid esters, sucrose fatty acid esters, polyoxyalkylene sorbitan fatty acid esters, fatty acid monoglycerides, polyoxyalkylene fatty acid monoglycerides, polyglycerin fatty acid esters, polyoxyalkylene castor oil ethers, polyoxyalkylene alkylamines, polyoxyalkylene alkylamides and so on.

The anionic surfactants containing two or more hydroxyl groups per molecule include, *inter alia,* castor oil monosulfate, castor oil monophosphate, sorbitan fatty acid ester sulfate, sorbitan fatty acid ester phosphate, sorbitol fatty acid ester sulfate, sorbitol fatty acid ester phosphate, sucrose fatty acid ester sulfate, sucrose fatty acid ester phosphate, polyoxyalkylene castor oil ether monosulfate, polyoxyalkylene castor oil ether monophosphate, polyoxyalkylene sorbitan fatty acid ester sulfate, polyoxyalkylene sorbitan fatty acid ester phosphate, polyoxyalkylene glycerin ether monosulfate, polyoxyalkylene glycerin ether monophosphate and so on.

The cationic surfactants containing two or more hydroxyl groups per molecule include, *inter alia,* dialkanolamine salts, trialkanolamine salts, polyoxyalkylene alkylamine ether salts, trialkanolamine fatty acid ester salts, polyoxyalkylene dialkanolamine ether salts, polyoxyalkylene trialkanolamine ether salts, di(polyoxyalkylene)alkylbenzylalkylammonium salts, alkylcarbamoylmethyldi(polyoxyalkylene)ammonium salts, polyoxyalkylenealkylammonium salts, polyoxyalkylenedialkylammonium salts and so on.

The amphoteric surfactants containing two or more hydroxyl groups per molecule include, *inter alia,* N,N-di($\beta$-hydroxyalkyl)-N-hydroxyethyl-N-carboxyalkylammonium betaine, N-$\beta$-hydroxyalkyl-N,N-dipolyoxyalkylene-N-carboxyalkylammonium betaine, N-alkyl-N,N-di(polyoxyalkylene)amine dicarboxylic acid monoesters, N-(polyoxyethylene)-N', N'-di (polyoxyethylene)aminoalkyl-N-alkyl-N-sulfoalkylammonium betaine, N,N-di(polyoxyethylene)-N-alkyl-N-sulfoalkyleneammonium betaine, N-($\beta$-hydroxyalkylaminoethyl)-N-($\beta$-hydroxyalkyl) aminoethylcarboxylic acid, N,N'-bis(2-hydroxyalkyl)-N,N'-bis(carboxyethyl)-ethylenediamine salts, N-($\beta$-hydroxyalkyl)-N',N',-di(polyoxyethylene)-N-carboxyethylethylenediamine salts and so on.

These surfactants may be used either independently or in combination. Moreover, by adjusting the addition level of the surfactant, the diameter of the product particles can be controlled. Assuming that the same kind of surfactant is employed, the use of it in a larger proportion results in a smaller particle diameter and the reverse is true, too. Thus, the proportion is dependent on the desired particle diameter but is generally not less than 3 percent by weight based on the isocyanate compound. Since, in the present invention, the surfactant containing two or more hydroxyl groups per molecule acts not only as an emulsifier-dispersing agent but also reacts with the isocyanate compound to act as a curing agent for the polymer, it is preferably used in an excess over the usual amount for emulsification.

When it is desired to obtain particles of extremely small diameter, a known emulsifier-dispersing agent may be previously incorporated in the dispersing medium to assist in the emulsification of the mixture of said isocyanate compound and said surfactant containing two or more hydroxyl groups per molecule.

The dispersing medium to be employed in the present invention may be virtually any medium that does not dissolve but disperse said isocyanate compound, but water or an organic solvent inert to isocyanato groups is preferred. As examples of the organic solvent which does not dissolve but disperse the isocyanate compound and is inert to isocyanato groups, there can be mentioned organic solvents which do not contain any active hydrogen-containing functional groups, which are reactive to isocyanato groups, such as —OH, —NH$_2$, —SH and so on. Specifically, such organic solvent can be selected from among paraffin, esters, ketones, aromatic hydrocarbons, halogen compounds, ethers, and so on. These solvents may be used in combination.

When water is used as the dispersing medium, the proportion of the surfactant containing two or more hydroxyl groups per molecule is 3 to 95 percent by weight and preferably 5 to 60 percent by weight based on the isocyanate compound. When an organic solvent inert to isocyanato groups is used as the dispersing medium, the proportion of said surfactant is 3 to 1000 percent by weight based on the isocyanate compound.

The principle of formation of polymer particles in the present invention is explained below.

When a mixture of said isocyanate compound and said surfactant containing two or more hydroxyl groups per molecule is added to said dispersing medium, the mixture is emulsified and dispersed in the form of fine droplets in the dispersing medium under the influence of the emulsifying-dispersing action of the surfactant. And the isocyanate compound reacts with the hydroxyl groups of the surfactant to form urethane linkages, whereby polymer particles entrapping the surfactant are produced. Therefore, if the surfactant used is nonionic, anionic, cationic or amphoteric, the resulting particulate polymer will also be nonionic, anionic, cationic or amphoteric respectively.

Since the surfactant is entrapped in the particulate polymer by way of urethane linkages, the particles are not agglomerated but can be dispersed so efficiently that a protective colloid is not required.

When water is used as the dispersing medium, a portion of the isocyanate compound reacts with water to give urea bonds, thus contributing to the hardening of particles. Moreover since carbon dioxide gas is evolved, the formation of porous particles is facilitated.

For promoting the hardening of particles, a catalyst of the conventional amine type or metal type can be added. Moreover, as the crosslinking agent, a known polyamine compound can be added. Such catalyst and crosslinking agent may be added to the dispersing medium or a mixture of said isocyanate compound and said surfactant.

Sufficient emulsification can be achieved by the usual stirring technique (50 to 1000 rpm) in many cases but a homodisperser, homogenizer or the like can be employed as necessary.

The weight ratio of the mixture to be emulsified to the dispersing medium is generally about 1:0.5 to 1:100 and preferably about 1:1 to 1:20.

While the curing reaction time varies with the kind of isocyanate compound, the type and amount of catalyst, the reaction temperature, etc., it is generally about 5 minutes to one day. The curing reaction temperature is generally 5 to 100° C. and preferably room temperature to 80° C.

The curing reaction results in the formation of a slurry which may be used as it is or as processed into a powder by filtration and drying. The filtration and drying processes are not critical and may be conducted under the conventional conditions.

Colored particles can be produced by incorporating a colorant in a mixture of said isocyanate compound and said surfactant containing two or more hydroxyl groups per molecule. When such colored particles are incorporated in a coating composition, a coating film having a suede-like or velvet-like texture is obtained. As the colorant used for this purpose, the known organic pigments, inorganic pigments and dyes can be used. The addition level of such a colorant is about 0.1 to 90 percent by weight relative to the isocyanate compound. In mixing the colorant into the coating composition, a sufficient mixing effect can be generally achieved by the usual stirring technique (50~1000 rpm) because of the comparatively large amount of surfactant contained but, if necessary, a kneader, ball-mill, bead-mill, roller mill, homodisperser, homogenizer or the like may be employed for mixing. When the mixture is too viscous to be handled with ease, a diluent solvent is preferably added. The diluent solvent should be chosen from among those not reactive to the dispersing agent.

As applications of the present invention, particulate polymers having various functions can be produced by incorporating various drugs or the like in mixtures of said isocyanate compound and said surfactant containing two or more hydroxyl groups. Some principal applications are mentioned below.

(a) By adding an enzyme, an immobilized enzyme can be obtained. Examples of the enzyme are amylase, invertase, galactosidase, glucose isomerase, cellulase, glucosidase, oxidase, lipase, protease, peptidase, esterase, peroxidase and other known enzymes. Immobilization of enzymes contributes to cost reduction, long-term stability and ease of recovery. The immobilized enzyme particles according to the invention can be used in the production of useful substances by means of a bioreactor or the like.

(b) By adding an agrochemical or a drug, a controlled-release preparation can be obtained. Examples of the agrochemical are the known herbicides, fungicides, insecticides, soil sterilants, plant growth regulators and so on. With regard to the drug, various known drugs can be employed.

(c) By adding a perfume or a deodorant, particles adapted to release a fragrance over a protracted time or deodorant particles insuring a sustained malodor-controlling effect can be manufactured.

(d) By adding a metal dust or powder, a metal-containing particulate polymer can be manufactured. Examples of the metal powder are the known powders of gold, silver, copper, nickel, tin, aluminum, iron, zinc, chromium, cobalt, tungsten, titanium, platinum, etc., inclusive of various alloys thereof. The particles containing such metal powder have metallic glosses and find application in the field of electromagnetic shields or as electrically conductive powders.

The present invention accordingly offers the following effects.

(1) Because a surfactant containing two or more hydroxyl groups per molecule is entrapped in a particulate polymer by way of urethane bonding, the particles are highly dispersible and no agglomeration of particles takes place during and after curing reaction. Therefore, the use of a protective colloid can be avoided.

(2) Since no protective colloid is used, the viscosity of the reaction system is low and the recovery of product particles by centrifugation or filtration is greatly expedited.

(3) Since the technology does not involve the use of a protective colloid, it does not require a washing step for removal of the protective colloid and is, therefore, conducive to a redused cost of production.

(4) Since a surfactant is entrapped in the polymer particle by way of urethane bonding, the product particles themselves have surface activity and, therefore, insure excellent dispersibility.

The following examples and comparative examples are further illustrative but by no means limitative of the present invention.

EXAMPLE 1

A urethane prepolymer, prepared by reacting 1 mole of trimethylolpropane with 3 moles of tolylene diisocyanate, was used as the isocyanate compound. On the other hand, a polyoxyethylene-polyoxypropylene block polymer (mol. wt. 1,000, polyoxyethylene content 20 wt. %) was used as the nonionic surfactant containing two or more hydroxyl groups per molecule. A mixture of the above-mentioned urethane prepolymer (100 g) and nonionic surfactant (30 g) was added to 700 g of water under stirring with a magnetic stirrer and the curing reaction was carried out at 40° C. with continued stirring (300~500 rpm) for 5 hours. The resulting slurry was suction-filtered and dried in the air to give nonionic beads with an average diameter of 120 μm.

EXAMPLE 2

The procedure of Example 1 was repeated except that 30 g of castor oil monosulfate calcium salt (an anionic surfactant) was used as the surfactant containing two or more hydroxyl groups per molecule. As a result, anionic beads with an average diameter of 140 μm were obtained.

EXAMPLE 3

The procedure of Example 1 was repeated except that 30 g of lauryldiethanolamine hydrochloride (a cationic surfactant) was used as the surfactant containing two or more hydroxyl groups per molecule. As a result, cationic beads with an average diameter of 90 μm were obtained.

EXAMPLE 4

The procedure of Example 1 was repeated except that 30 g of N,N-di(β-hydroxylauryl)-N-hydroxyethyl-N-carboxybutylammonium betaine (an amphoteric surfactant) was used as the surfactant containing two or more hydroxyl groups per molecule. As a result, amphoteric particles with an average particle diameter of 100 μm were obtained.

EXAMPLE 5

A carbodiimide-modified diphenylmethane diisocyanate (100 g) (the isocyanate compound), a polyoxyethylene-polyoxypropylene block polymer (mol. wt. 1,500, polyoxyethylene content 40 wt. %) (20 g) (the nonionic surfactant containing two or more hydroxyl groups per molecule) and 10 g of titanium dioxide (the colorant) were mixed in a beaker.

This mixture was added to 500 g of water under stirring with a magnetic stirrer and the curing reaction was carried out at 45° C. with continued stirring (300~500 rpm) for 10 hours. The average diameter of the resulting nonionic white beads was measured with a Coulter counter. The average particle diameter of this product was 35 μm.

The product slurry was then suction-filtered. The required filtration time was 5 minutes. The cake was dried in vacuo at 60° C. to give a neat powder. When this product (30 g) was added to a commercial one-package urethane coating (50 g) and the mixture was gently stirred (300 rpm), it was evenly dispersed to give a white mat-finish coating composition. The film formed from this coating composition was a matted film with a hard feeling.

COMPARATIVE EXAMPLE 1

The procedure of Example 5 was repeated except that, in lieu of the surfactant containing two or more hydroxyl groups per molecule, polyoxyethylene-nonylphenylether sulfate sodium salt was used as the emulsifier.

The average particle diameter of the resulting colored (white) beads was 40 μm. The slurry was reduced to powder as in Example 5 and 30 g of the powder was added to 50 g of a commercial one-package urethane coating, followed by gentle stirring (300 rpm). However, the powder could not be evenly dispersed. The beads could be dispersed only after 60 minutes of intense stirring at 5,000 rpm with a homodisperser.

The above result was brought about because the surfactant containing two or more hydroxyl groups per molecule was not used and, hence, the dispersibility of the beads was poor. The film formed from this coating composition betrayed projections attributable to aggregation of particles.

COMPARATIVE EXAMPLE 2

The procedure of Example 5 was repeated except that 20 g of polyvinyl alcohol in water was used as the protective colloid.

The resulting white particles had an average particle diameter of 33 μm. The product slurry was suction-filtered. However, owing to the thickening effect of the protective colloid, the filtration procedure required 70 minutes. When the filter cake was dried in the air, the residual polyvinyl alcohol formed a film interconnecting the particles so that caking occurred to prevent formation of a neat powder. When this filter cake was washed with 2 portions of water and dried, a neat powder could be obtained.

Compared with Example 5, this Comparative Example required a superfluous washing step for removal of the residual polyvinyl alcohol.

The colored particles obtained after washing and drying were less dispersible., owing to the residual polyvinyl alcohol, though its amount was small, than the particles of Example 5 and the coating film also betrayed projections due to aggregation of the particles.

EXAMPLE 6

An isocyanato-terminated prepolymer (250 g) (the isocyanate compound) which was obtained by reacting polypropylene glycol (mol. wt. 2,000) with tolylene diisocyanate, sorbitan monostearate monophosphate ester (50 g) (the anionic surfactant containing two or more hydroxyl groups per molecule), and carbon black (15 g) (the colorant) were mixed together in a ball mill for 30 minutes.

This mixture (100 g) was emulsified in 300 g of water under stirring with a magnetic stirrer and, then, triethylamine (1.5 g) was added as the catalyst. The curing reaction was conducted at room temperature with stirring (500 rpm) for 5 hours. The resulting slurry was suction-filtered and freeze-dried. The resulting powder had an average particle diameter of 65 μm.

The black anionic beads thus obtained had an elastic and kind feeling.

When 50 g of this product and 50 g of a commercial aqueous urethane coating were mixed with stirring (300 rpm), a uniform dispersion was obtained. The coating film was black and had a suede-like texture with a kind feeling.

EXAMPLE 7

An isocyanato-terminated prepolymer (1,400 g) (the isocyanate compound) obtainable by reacting polyoxybutylene glycerin ether (mol. wt. 4,000) with isophorone diisocyanate, an isocyanato-terminated prepolymer (350 g) (the isocyanate compound) obtainable by reacting trimethylolpropane with hexamethylene diisocyanate, polyoxyethylene-laurylammonium (120 g) (the cationic surfactant), titanium dioxide (250 g) (the colorant), xylene (300 g) (the diluent), and dibutyltin dilaurate (0.5 g) (the reaction catalyst) were mixed and emulsified in 3 kg of water with stirring at 60° C. The curing reaction was conducted with stirring (500 rpm) for 1 hour.

The resulting slurry was centrifuged and the cake was dried in the air at 70° C. to give a powder. This product was a cationic powder having an average particle diameter of 20 μm. This product was not soluble in any of methanol, ethanol, hexanol, hexane, isooctane, xylene, toluene, ethyl acetate, acetone, methyl ethyl ketone, methyl isobutyl ketone, dimethylformamide, ethylcellosolve, ethylcellosolve acetate, machine oil and soybean oil, and thus exhibited excellent resistance to chemicals.

When 1 kg of this particulate product was mixed gently with 1 kg of a commercial aqueous urethane coating (300 rpm), a uniform dispersion was obtained. The coating film had a subtle velvet-like texture with a kind feeling. The film showed no yellowing even after 6 months, indicating that it was highly weather-resistant.

EXAMPLE 8

An isocyanato-terminated prepolymer (1,500 g) (the isocyanate compound) obtainable by reacting a polyester polyol (average mol. wt. 3,500) with tolylene diisocyanate and sucrose trioleate (45 g) (the nonionic surfactant) were mixed together and the mixture was added for emulsification to 3 kg of water containing 3 wt. % of sodium dioctylsulfosuccinate as the auxiliary emulsifier at 25° C. Then, 12 g of hexamethylenediamine was added as the crosslinking agent and the curing reaction was carried out with constant stirring (500 rpm) at 25° C. for 7 hours. The resulting slurry was centrifuged and the resulting cake was freeze-dried to give a powder. Having an average particle diameter of 300 μm, this product was a transparent, elastic nonionic powder in the bead form.

EXAMPLE 9

Exactly the same procedure as Example 8 was followed except that sucrose trioleate as the surfactant was used in varying amounts of 50 g, 100 g, 200 g and 500 g. The average particle diameters of the respective products are shown in Table 1.

TABLE 1

| The amount of sucrose trioleate (g) | 50 | 100 | 200 | 500 |
|---|---|---|---|---|
| The average particle diameter of the product (μm) | 280 | 54 | 5.5 | 1.3 |

It is apparent from Table 1 that beads with varying particle diameters can be manufactured by adjusting the proportion of the surfactant.

EXAMPLE 10

The procedure of Example 5 was repeated except that 10 g of O,O-diisopropyl-S-benzylthiophosphate (a fungicide) was used as the agrochemical in lieu of the colorant. As a result, fungicidal beads having an average particle diameter of 33 μm were obtained.

EXAMPLE 11

The procedure of Example 5 was repeated except that 10 g of pyrethrin (an insecticide) was used as the agrochemical in lieu of the colorant. As a result, insecticidal beads having an average particle diameter of 35 μm were obtained.

EXAMPLE 12

The procedure of Example 5 was repeated except that 10 g of aspirin [an antipyretic-analgesic] was used as the drug in lieu of the colorant. As a result, aspirin-containing beads having an average particle diameter of 37 μm were obtained.

EXAMPLE 13

The procedure of Example 5 was repeated except that 10 g of β-glucosidase of yeast origin was used as the enzyme in lieu of the colorant. As a result, β-glucosidase-containing beads having an average particle diameter of 33 μm were obtained.

EXAMPLE 14

The procedure of Example 5 was repeated except that 10 g of lemon oil was used as the perfume in lieu of the colorant. As a result, beads giving off a lemon-like fragrance was obtained. The average particle diameter of this product were 35 μm.

EXAMPLE 15

The procedure of Example 5 was repeated except that 2 g of muscone was used as the perfume in lieu of the colorant. The resulting muscone-containing beads had an average particle diameter of 37 μm.

EXAMPLE 16

The procedure of Example 5 was repeated except that 10 g of essential oil was used as the deodorant in lieu of the colorant. The resulting essential oil-containing beads had an average particle diameter of 32 μm.

EXAMPLE 17

The procedure of Example 5 was repeated except that 10 g of copper dust was used in lieu of the colorant. The resulting copper dust-containing beads had an average particle diameter of 35 μm.

EXAMPLE 18

The procedure of Example 5 was repeated except that 10 g of gold powder was used in lieu of the colorant. As a result, gold powder-containing beads having an average particle diameter of 34 μm were obtained.

EXAMPLE 19

A mixture of tolylene diisocyanate (174 g) (the isocyanate compound) and a polyoxyethylene-polyoxypropylene block polymer (mol. wt. 1,000, polyoxyethylene content 20 wt. %) (1,000 g) (the nonionic surfactant containing two or more hydroxyl groups per molecule) was added to 2,000 g of kerosene with stirring and the curing reaction was carried out with stirring (500 rpm) at 85° C. for 2 hours. The resulting slurry was suction-filtered and dried in the air to give nonionic beads with an average particle diameter of 45 μm.

EXAMPLE 20

The procedure of Example 19 was repeated except that 1,030 g of castor oil monosulfate ammonium salt (an anionic surfactant) was used as the surfactant containing two or more hydroxyl groups per molecule. As a result, anionic beads having an average particle diameter of 35 μm were obtained.

EXAMPLE 21

The procedure of Example 19 was repeated except that 240 g of lauryldiethanolamine hydrochloride (a cationic surfactant) was used as the surfactant containing two or more hydroxyl groups per molecule. As a result, cationic beads having an average particle diameter of 43 μm were obtained.

EXAMPLE 22

The procedure of Example 19 was repeated except that 305 g of N,N-di(hydroxyethyl)-N-lauryl-N-carboxy-methylammonium betaine (an amphoteric surfactant) was used as the surfactant containing two or more hydroxyl groups per molecule. As a result, amphoteric beads having an average particle diameter of 40 μm were obtained.

EXAMPLE 23

Hexamethylene diisocyanate (168 g) (the isocyanate compound), a polyoxyethylene-polyoxypropylene block polymer (mol. wt. 1,500, polyoxyethylene content 30 wt. %) (750 g) (the nonionic surfactant containing two or more hydroxyl groups per molecule) and titanium dioxide (140 g) (the colorant) were mixed together.

This mixture was added to 3,500 g of kerosene with stirring and, then, 58 g of hexamethylenediamine was added as the crosslinking agent. The curing reaction was conducted under constant stirring (300–500 rpm) at 45° C. for 10 hours. The average diameter of the resulting nonionic white beads was 42 μm.

The slurry thus obtained was suction-filtered. The required filtration time was 10 minutes. The filter cake was dried in vacuo at 60° C. to give a neat powder. This product (100 g) was added to a commercial one-package urethane coating (140 g) and the mixture was gently stirred (300 rpm) to give a uniform dispersion. The coating film was elastic and white, with a suede-like texture.

COMPARATIVE EXAMPLE 3

The procedure of Example 23 was repeated except that polyoxyethylene nonylphenylether was used as the emulsifier in lieu of the surfactant containing two or more hydroxyl groups per molecule.

The emulsifier polyoxyethylene nonylphenylether is a surfactant containing one hydroxyl group per molecule, which does not function as a crosslinking agent for the isocyanate compound but rather acts as a crosslinking terminator. Therefore, the degree of cure of the particles was insufficient even after the above reaction time and the particles were sticky and inadequate in strength. Furthermore, because of this tackiness, the product could not be well dispersed in coating compositions.

COMPARATIVE EXAMPLE 4

The procedure of Example 23 was repeated except that 300 g of oil-modified alkyd resin in kerosene was used as the protective colloid.

The average diameter of the resulting white particles was 47 μm. The slurry thus obtained was suction-filtered. Owing to the thickening effect of the protective colloid, the filtration procedure required 2 hours. When the filter cake was dried in the air, the residual protective colloid formed a film interconnecting the colored particles to prevent formation of a powdery product. Therefore, the filter cake was washed twice with kerosene and, then, dried in the air to give a powder.

Compared with Example 23, this Comparative Example required a superfluous washing step for removal of the residual protective colloid.

The colored particles recovered by the above washing and drying steps were inferior to the particles of Example 23 in dispersibility for the manufacture of a coating because of the protective colloid that had remained, though in a small amount, and the coating film also betrayed projections formed by aggregation of the particles.

EXAMPLE 24

A mixture of an isocyanato-terminated prepolymer (2,504 g) (the isocyanate compound) obtainable by reacting polyoxypropylene glycerin ether (mol. wt. 2,000) with hexamethylene diisocyanate, an isocyanato-terminated prepolymer (638 g) (the isocyanate compound) obtainable by reacting trimethylolpropane with hexamethylene diisocyanate, lauryldiethanolamine hydrochloride (741 g) (the cationic surfactant), titanium dioxide (200 g) (the colorant), dibutyltin dilaurate (2 g) (the reaction catalyst) and ethyl acetate (350 g) (the diluent solvent) was added for emulsification to 10 kg of isooctane with stirring. The curing reaction was then conducted under stirring (300–500 rpm) at 60° C. for 7 hours.

The resulting slurry was centrifuged and the resulting cake was dried in the air to give a powder. This product was a cationic white powder with an average particle diameter of 30 μm. This product was insoluble in any of methanol, ethanol, hexanol, hexane, isooctane, xylene, toluene, ethyl acetate, acetone, methyl ethyl ketone, methyl isobutyl ketone, dimethylformamide, ethylcellosolve, ethylcellosolve acetate, machine oil and soybean oil, and thus exhibited excellent resistance to chemicals.

When 1 kg of the above product was gently admixed with 1 kg of a commercial aqueous urethane coating (at 300 rpm), a uniform dispersion was obtained. The coating film had a subtle velvet-like texture. The film did not undergo yellowing over six months, thus being highly weather-resistant.

EXAMPLE 25

A mixture of an isocyanato-terminated prepolymer (2,848 g) (the isocyanate compound) obtainable by reacting a polyester polyol (average mol. wt. 2,500) with tolylene diisocyanate and sucrose trioleate (100 g) (the nonionic surfactant) was added to hexane containing 2 wt. % of calcium dodecylbenzenesulfonate (the auxiliary emulsifier) with stirring for emulsification. Then, 90 g of hexamethylenediamine was added as the crosslinking agent and the mixture was stirred (300–500 rpm) at 50° C. for 6 hours for curing. The resulting slurry was centrifuged and the resulting cake was freeze-dried to give a powder. The average particle diameter of this powder was 250 μm. This was a transparent, elastic nonionic product in the bead form.

EXAMPLE 26

The procedure of Example 25 was repeated except that the amount of the surfactant sucrose trioleate was varied to 200 g or 400 g and the amount of the crosslinking agent hexamethylenediamine was varied to 65 g or 14 g. The average particle diameters of the resulting beads are shown in Table 2.

TABLE 2

| | | |
|---|---|---|
| The amount of sucrose trioleate (g) | 200 | 400 |
| The average particle diameter of the product (μm) | 25 | 7.5 |

It is apparent from Table 2 that beads having different diameters can be manufactured by varying the amount of the surfactant.

What is claimed is:

1. A method of producing a particulate polymer characterized in that a mixture of an isocyanate compound containing two or more isocyanato groups per molecule and a surfactant containing two or more hydroxyl groups per molecule is emulsified and cured in a dispersing medium which does not dissolve said isocyanate compound without use of a protective colloid.

2. The production method of claim 1 which is characterized in that said surfactant is used in a proportion of not less than 3 percent by weight based on said isocyanate compound.

3. The production method of claim 1 which is characterized in that said isocyanate compound is a polyisocyanate compound and/or a urethane prepolymer.

4. The production method of claim 1 which is characterized in that said surfactant is at least one member selected from the group consisting of nonionic surfactants, anionic surfactants, cationic surfactants and amphoteric surfactants.

5. The production method of claim 1 which is characterized in that said dispersing medium is water.

6. The production method of claim 1 which is characterized in that said dispersing medium is an organic solvent inert to isocyanato groups.

7. The production method of claim 1 which is characterized in that at least one member selected from the group consisting of colorants, agrochemicals, enzymes, drugs, perfumes, deodorants and metal powders is incorporated in said mixture of isocyanate compound and surfactant.

* * * * *